INVENTOR.
Nathan J. Watson
BY Albert G. McCaleb
Atty.

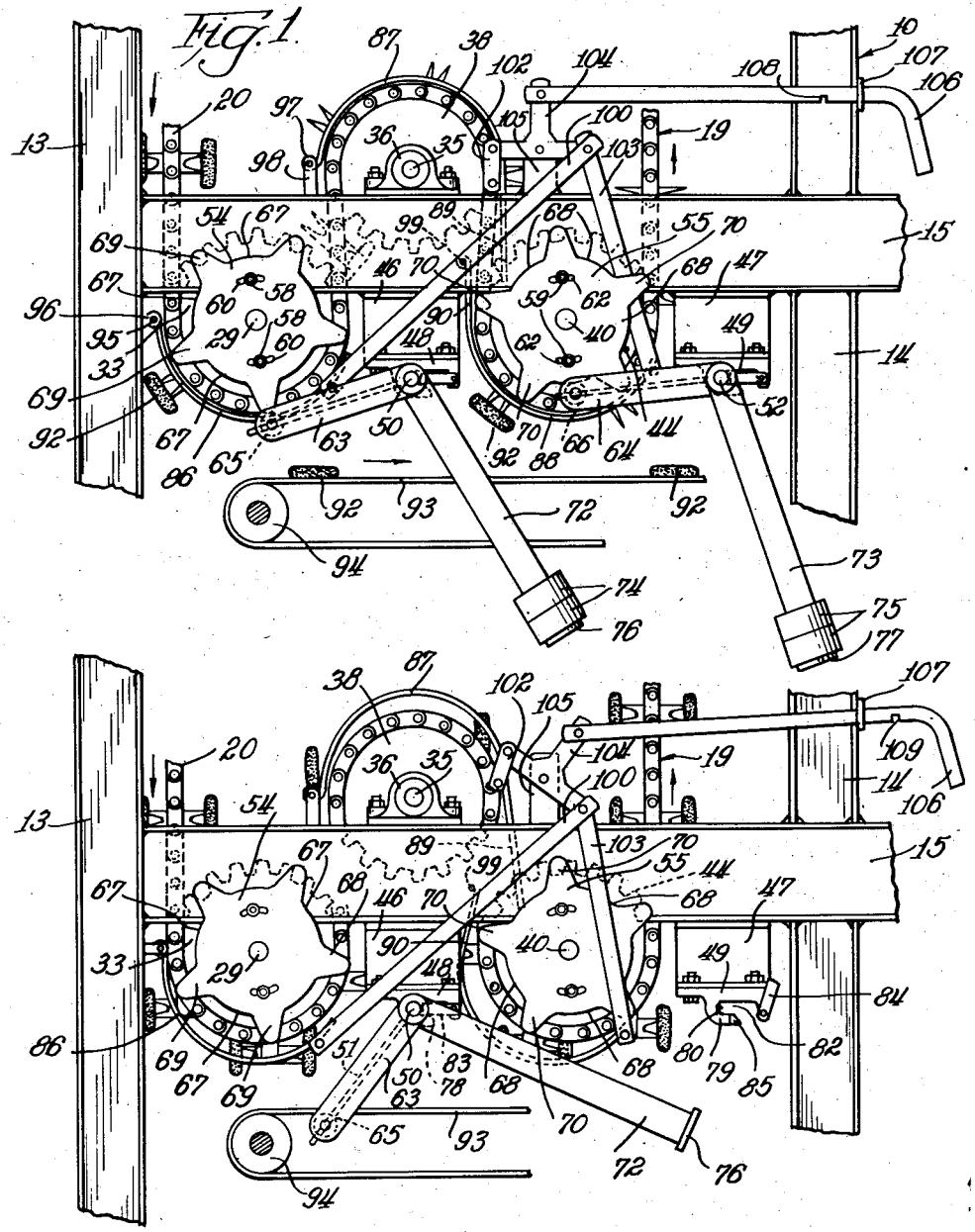

Patented Oct. 2, 1951

2,569,839

UNITED STATES PATENT OFFICE 2,569,839

UNLOADING MECHANISM FOR COOKY COATING CONVEYERS

Nathan J. Watson, Sioux City, Iowa, assignor to Johnson Biscuit Company, Sioux City, Iowa, a corporation of Iowa Application June 1, 1949, Serial No. 96,468

10 Claims. (Cl. 198—185)

This invention relates to an unloading mechanism for cooky coating apparatus and the like, and more particularly to a mechanism for effecting the removal of dip-coated and dried cookies and the like from the conveyor of trolley type dip-coating equipment.

The unloading mechanism of this invention is related to, and usable in the place of that shown and described in the copending application, Serial No. 773,450, entitled Method and Apparatus for Dip-Coating Cookies and the Like, in which I am a coinventor with William R. Steingraber.

One of the objects of this invention is to provide an efficient and effective unloading mechanism for removing cookies from a continuously moving conveyor, and from which mechanism operating parts are easily and readily removable for cleaning.

My invention has for another object the provision of a conveyor unloading mechanism having separately actuated parts for effecting the removal of cookies or the like from oppositely projecting tangs on a conveyor and either or both of which parts may be quickly and easily brought into operation or rendered inoperative.

As another object, the invention has within its purview the provision of an unloading mechanism adapted to use with a chain conveyor having oppositely projecting carrying tangs which are normally free to rotate relative to the conveyor chains, and which mechanism embodies guides for controlling the positions of the tangs and means for moving the guides between operative and inoperative positions.

It is a further object of this invention to provide an unloading mechanism having parts adapted to operation in synchronized relationship to the movements of a conveyor and wherein means is provided for adjusting the timing of the unloader operation in relation to that of the conveyor.

Other objects and advantages of the invention will be apparent from the following description and the accompanying drawings in which similar characters of reference indicate similar parts throughout the several views.

Referring to the two sheets of drawings,

Fig. 1 is a side elevational view of a preferred embodiment of my unloading mechanism with the parts thereof shown in their normal operating positions; the mechanism being illustrated in its application to a chain conveyor of the type utilized for the manufacture of dip-coated cookies and the like;

Fig. 2 is a view similar to Fig. 1, but with certain of the parts in different positions and with one part removed to illustrate a detail of the structure;

Figure 3:
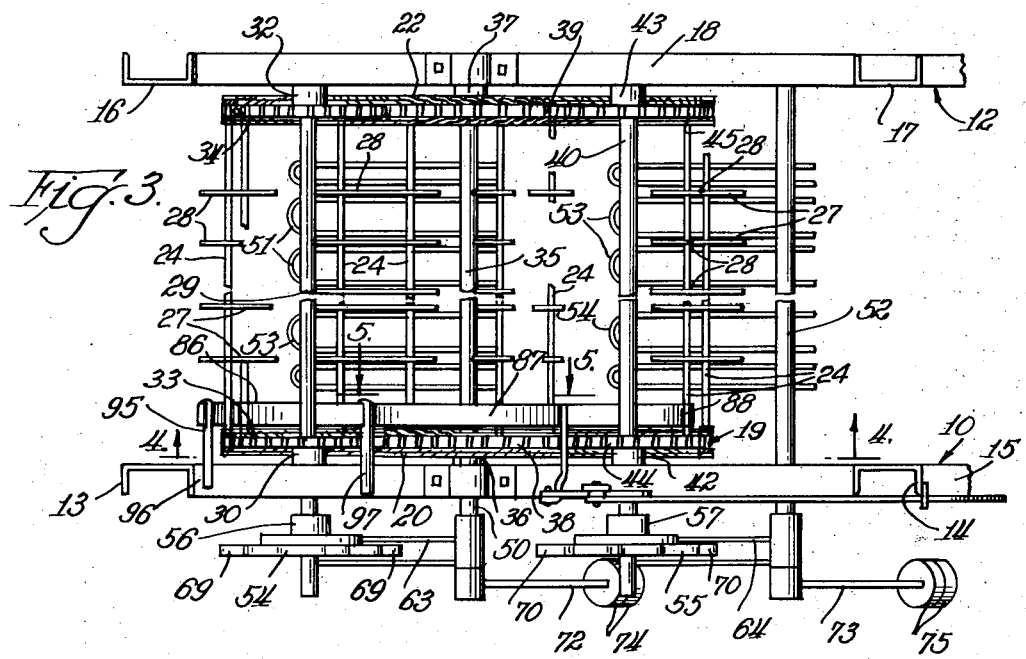
Fig. 3 is a top plan view of the unloading mechanism illustrated in Fig. 1.

The exemplary embodiment of my unloading mechanism, which is shown in the accompanying drawings for illustrative purposes, is depicted in an adaptation to a chain conveyor structure having opposed and substantially parallel supporting frame structures 10 and 12 in spaced relationship. The supporting frame structure 10 includes upright channels 13 and 14 connected by a horizontal beam 15; while the supporting frame structure 12 includes upright channels 16 and 17 and a horizontal beam 18. A conveyor 19, of the endless chain type, is supported between the supporting frame structures 10 and 12. This conveyor has similar and substantially parallel side chains 20 and 22, which side chains carry a series of hook bars 23 in spaced relationship longitudinally of the chains and in substantially parallel relationship to one another.

In the disclosed structure, the hook bars have cross bar portions 24, at each end of which is secured a support strap 25; the cross bar portions being at one end of each of the straps and the mid-portions of the straps having openings therein to receive projecting studs 26 on the chains. Thus, the hook bars are supported for relatively free rotation relative to the chains and are suspended so as to seek a normal position or level relative to the chains. Projecting outwardly from opposite sides of the hook bars are rows of tangs 27 and 28, which tangs are preferably so disposed in respect to the hook bars that they normally project horizontally. In the presently undisclosed portion of the conveyor which precedes the loading mechanism depicted herein, base cakes or the like are applied to the tangs and are carried thereby during dip-coating and drying operations. When the dip-coated cakes reach the unloading mechanism shown herein, the dip-coating is dried and the base cakes are ready for removal from the conveyor for packaging, unless a second dip-coating cycle is desired. In the latter instance, the unloading mechanism may be rendered ineffective, so that the cookies remain on the conveyor for a second circuit of travel.

At the unloading position which is disclosed herein, the conveyor chains 20 and 22 are carried by three aligned pairs of coaxial pulleys having their axes in staggered relationship. That is, a shaft 29 is journalled in bearings 30 and 32 which are secured to the beams 15 and 18 respectively and has a pair of sprockets 33 and 34 secured thereto at its opposite ends. A second shaft 35 is journalled in bearings 36 and 37 secured to the upper surfaces of the beams 15 and 18 and has a pair of sprockets 38 and 39 secured thereto. A third shaft 40, like the first shaft 29, is journalled in bearings 42 and 43 which are secured to the lower surfaces of the beams 15 and 18 respectively. This third shaft has a pair of sprockets 44 and 45 secured thereto. The bearings for the first and third shafts 29 and 40 being secured to the lower surfaces of the beams 15 and 18, while the bearings for the second shaft 35 are secured to the upper surfaces of those beams, the axes of the third shafts and their respective sprockets are in staggered relationship to one another, with the axis of the second or intermediate shaft displaced from alignment with the axes of the first and third shafts. The normal direction of travel of the disclosed conveyor is such that it progresses around the sprockets 33 and 34 to the sprockets 38 and 39 and thence to and beyond the sprockets 44 and 45. Thus, as viewed in Figs. 1, 2, 3 and 4, the loaded hook bars enter the unloading position at the left side and progress toward the right.

Figure 4:
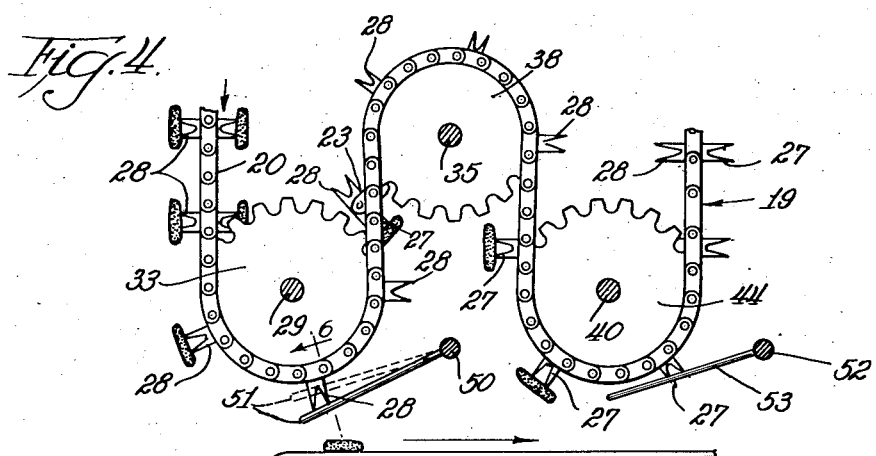
Fig. 4 is a fragmentary sectional view illustrating a sequence of the operation of my unloading mechanism, and wherein the section is taken substantially on a line 4—4 of Fig. 3 and in the direction indicated by accompanying arrows.
Figure 5:
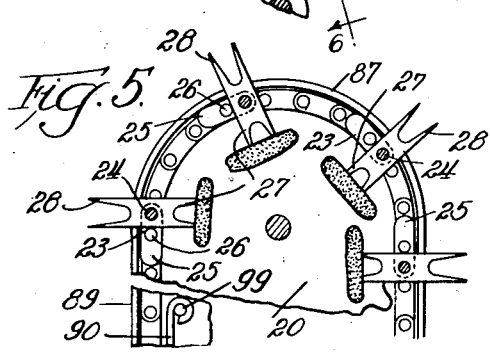
Fig. 5 is a fragmentary side sectional view taken substantially on a line 5—5 of Fig. 3 and in the direction indicated by accompanying arows.
Figure 6:
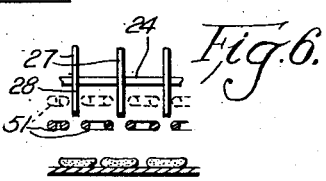
Fig. 6 is a fragmentary sectional view taken substantially on a line 6—6 of Fig. 4.

Near and on corresponding sides of the shafts 29 and 40, as depicted in Figs. 1 and 2, brackets such as 46 and 47 are secured to the lower surfaces of the beams 15 and 18 and carry bearings 48 and 49. The latter bearings have shafts 50 and 52 journalled for rotation therein. The axes of the shafts 50 and 52 are substantially parallel to the axes of the shafts 29, 35 and 40. As shown in Figs 3 and 4, fingers 51 project in a substantially coplanar row from one side of the shaft 50. Likewise, fingers 53 project in a substantially coplanar row from one side of the shaft 52. In my preferred structure, the fingers 51 and 53 are in the form of substantially U-shaped rows and are spaced longitudinally of the shafts 50 and 52, so that the spaces therebetween correspond to the spacing of the tangs 27 and 28 on the hook bars. The spacing of the shafts 50 and 52 from the hook bars is sufficient to provide ample clearance for the projecting tangs as the conveyor moves. Also, the placement of the shafts 50 and 52 and the lengths of the fingers are such that the tangs normally pass between the fingers as the hook bars pass along the lower portions and upwardly adjacent the sprockets 33 and 44 respectively. It may be readily understood that in normal operation loaded tangs pass between the ends of the fingers while those fingers extend to positions closely adjacent the hook bars, and so that subsequent outward movement of the fingers along the tangs dislodges the cookies longitudinally of the tangs and without materially increasing the size of the openings left by the tangs. It may be further understood that the two rows of fingers effect the removal of the cookies from the oppositely projecting tangs on the two sides of the conveyor, and that in each instance the movements of the fingers must be timed and synchronized with respect to the movements of the conveyor.

For actuating and determining the instantaneous positions of the fingers in respect to the hook bars in the disclosed structure, I have provided cams 54 and 55 which are secured to the ends of the shafts 29 and 40 in spaced relationship to the sprockets 33 and 44 respectively and externally of the conveyor. By preference, and as depicted in Fig. 3, sprocket supporting hubs 56 and 57 are secured to the shafts 29 and 40 respectively, and the sprockets 54 and 55 are secured to the outer faces of the hubs by fastening means such as cap screws 58 and 59. Also, the cap screws 58 and 59 extend through slots 60 and 62 which are elongated circumferentially of the sprockets, so that the sprockets are circumferentially adjustable, within limits, with respect to the shafts 29 and 40, and thus with respect to the positions of the uniformly spaced hook bars of the conveyor.

Arms 63 and 64 are secured to and project radially from the shafts 50 and 52 respectively and have cam followers 65 and 66 mounted on their projecting ends for engagement with the peripheral surfaces of the cams 54 and 55 respectively. Arcuate surface portions 67 and 68 of the peripheries of the cams 54 and 55 respectively are interposed between projecting portions 69 and 70 on those cams and determine one limit of movement of the cam followers 65 and 66, thereby to determine one limit of movement of the fingers 51 and 53. The projecting portions 69 are generally alike and are spaced to correspond to the spacing of the hook bars on the conveyor. These projecting portions periodically effect actuation of the arms 63 and 64 to produce outward swinging movement of the fingers 51 and 53 in timed relationship to the passage of the hook bars along the path of the conveyor.

Arms 72 and 73 are secured to shafts 50 and 52 respectively and project radially therefrom in obtuse angular relationship to the arms 63 and 64. The latter arms have removable weights 74 and 75 carried on their projecting ends and respectively retained by end flanges 76 and 77 on those arms. With the arms 72 and 73 thus disposed, and carrying the weights 74 and 75, those weights bias the cam followers 75 and 76 toward and into engagement with the peripheral camming surfaces of the cams 54 and 55. On the other hand, when the weights 74 and 75 are removed from the arms 72 and 73, the weights of the fingers 51 and 53 and the arms 63 and 64 are sufficient to over-balance the weights of the arms 72 and 73 so that the fingers drop downwardly and away from the hook bars to positions such as that depicted for the arm 63 and fingers 51 in Fig. 2, so that the fingers remain in an inoperative position with respect to the conveyor. Such an inoperative position of the fingers is utilized, for example, when the dipped cookies are allowed to pass the unloading mechanism for a second dipping cycle on the conveyor.

In order to facilitate the removal of the shafts 50 and 52 for purposes such as the periodic cleaning of the fingers 51 and 53, the bearings 48 and 49 are of a construction which permits quick manual release of the shaft from the bearing without the use of tools. Although the bearings at the other ends of the shafts 50 and 52 may be like the bearings 48 and 49, they may be plain journal bearings from which the shafts may be removed longitudinally or into which the ends of the shafts may be slipped. In the disclosed structure, the bearings 48 and 49 (Fig. 2) have downwardly and laterally projecting hook portions 78 and 79 defining bearing surfaces, such as 80 having an open side 82 through which the shaft will pass. Fingers 83 and 84 are mounted for swinging movement relative to the bearings 48 and 49. In one position, the fingers are supported by a projecting lug 85 on one side of the hook portion 79, so that the end surface of the finger substantially closes the open side 82 of the bearing. In a retracted position, as depicted in Fig. 2, the finger 84 is swung away from the open side 82 of the bearing, so that the shaft may be removed or inserted.

In order to insure the desired and effective operation of the unloading mechanism, as well as to effect the sequential removal of cookies from the tangs on the two sides of the conveyor, the positions of the hook bars and their respective rows of tangs are controlled adjacent the fingers 51 and 53 and are effectively reversed during travel between one group of fingers and the other. For this purpose, I have provided guide rails 86, 87 and 88 adjacent the sprockets 33, 38 and 44 respectively. Each of these guide rails has a surface portion normally disposed to engage side surfaces of the support straps 25 at adjacent ends of the conveyor hook bars. The guide rail 86 is arcuate in shape and holds the hook bars in position as they pass the fingers 51, that position being such that the tangs on one side of the conveyor project outwardly in a direction substantially radial to the sprocket 33. A space between the end of the guide rail 86 and the guide rail 87 is provided for the hook bars to swing by gravity to positions, as illustrated in Figs. 1 and 4, wherein the tangs are practically reversed from their positions while guided by the rail 86, and wherein the unremoved cookies are on the side of the conveyor facing the sprocket 38 and shaft 35 before the support straps 25 on the hook bars are engaged by the guide rail 87. The guide rail 87 has an arcuate portion adjacent the sprocket 38, as well as an extended straight end portion 89 which overlaps an extended end portion 90 of the guide rail 88. Thus, with this arrangement, the support straps on the hook bars pass from guide rail 87 to guide rail 88 without reversal, so that the positions of the hook bars are effectively reversed with respect to the fingers 51 and 53 between the sprockets 33 and 44, and so that the remaining loaded tangs on the hook bars extend outwardly in a radial direction as they pass the sprocket 44 and the fingers 53, as shown in Figs. 1 and 4.

As the hook bars pass the sprocket 33, the fingers 51 move outwardly along the projecting tangs from a position near the hook bar to a position at or beyond the ends of the tangs, so that cookies 92 are dislodged from the tangs and dropped to a driven conveyor belt 93 which is carried by means including a roller 94 and is adapted to carry the cookies to a place for packing. After reversal of the hook bars, the projecting tangs on the loaded side of the conveyor pass the fingers 53, whereupon the remaining cookies are similarly dislodged by the latter fingers. In the disclosed structure, as may be observed from Fig. 1, the spacing of the parts of the unloading mechanism and the adjustments of the positions of the cams 54 and 55 are such that the fingers 51 and 53 are alternately actuated to dislodge cookies from the conveyor.

In the disclosed structure, the guide rails 86, 87 and 88 are supported for swinging movement, so that they may be manually moved to and from their effective positions relative to the hook bars. That is, the guide rail 86 has one end supported by a shaft 95 which is secured to a lug 96 on the upright channel 13. The guide rail 87 has a corresponding end hingedly supported by a shaft 97 which is secured by a lug 98 to the beam 15. Similarly, an end of the guide rail 88 is hingedly supported by a pin 99 projecting from the inner surface of the beam 15.

The ends of the guide rails 86, 87 and 88 opposite those supported by the shafts 96 and 97 and the pin 99 are movably supported by links 100, 102 and 103 respectively from a substantially T-shaped member 104. The substantially T-shaped member 104 is supported for rotational swinging movement by an arm 105 which is secured to the beam 15. At one end of the cross portion of the T-shaped member 104, the ends of the links 100 and 103 are movably connected thereto. At the other end of that cross member, one end of the link 102 is movably connected thereto. A handle 106 extends through a latch strip 107 on the channel 14 and has its end connected to the stem of the T-shaped member 104 at a distance from the support for that member. Manual actuation of the handle 106 swings the T-shaped member 104 between positions such as those illustrated in Figs. 1 and 2, thereby to actuate the guide rails between their normal operating positions, shown in Fig. 1, and their retracted or relatively ineffective positions, shown in Fig. 2. By preference, notches 108 and 109 are provided in the handle 106 for engagement with the latch strip 107 to retain the handle in the position to which it has been moved. It may be readily understood the retraction of the guide rails allows the hook bars to pass adjacent the sprockets 33, 38 and 44 without having their positions controlled. Such operation is utilized when the weights 74 and 75 have been removed from the arms 72 and 73, so that the fingers 51 and 53 are retracted to out-of-the-way positions.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In combination with a dip-coating conveyor for the production of cookies and the like and including substantially parallel side chains carrying hook bars in spaced and substantially parallel relationship, said hook bars being suspended for normally free rotation relative to the chains and having rows of spaced tangs projecting therefrom in opposite directions, and said conveyor chains being guided at an unloading position by three pairs of sprockets carried by three shafts and disposed so that the axis of one pair of sprockets is between and offset from the axes of the other two pairs of sprockets, an unloading mechanism including cams secured to the shafts of said other pairs of sprockets and having cam projections thereon spaced to correspond to the spacing of the hook bars on the conveyor chains, means for adjusting the positions of the cam projections relative to the positions of the hook bars, a shaft supported for rotational movement adjacent each of said other pairs of sprockets and each having a row of fingers thereon projecting between and closely adjacent opposite sides of the tangs on the hook bars, parts secured to each of the latter mentioned shafts and engaging one of said cams for effecting movements of the projecting ends of the fingers longitudinally of the tangs from and to positions close to the hook bars, and guide means for determining the positions of the hook bars and tangs relative to the conveyor chains as said chains pass around said sprockets.

2. In a combination as defined in claim 1, said parts secured to each of the shafts and engaging one of the cams for effecting movements of the fingers each including arms extending from the said shafts in angularly disposed relationship to one another, one of said arms having a cam follower thereon, the other of said arms carrying a weight for biasing the cam follower toward the cam.

3. In a combination as defined in claim 1, said guide means comprising curved straps mounted adjacent one of each pair of sprockets for engaging end portions of the hook bars, said straps being mounted for movement into and from engagement with the end portions of the hook bars, and manually operable means for effecting simultaneous movements of the straps.

4. In a combination as defined in claim 1, the finger supporting shafts each being supported by bearings, and the bearing at one end of each finger supporting shaft having a side opening of a size to pass the shaft, and a manually movable element hinged to the bearing for normally closing said side opening, said movable element being swingable to a position such that the shaft is readily removable from the bearing.

5. In a combination as defined in claim 1, there being additionally included between said other two pairs of sprockets means for effecting reversal of the tangs relative to the conveyor side chains.

6. In combination with a dip-coating conveyor for the production of cookies and the like and wherein said conveyor includes substantially parallel side chains carrying hook bars for free rotation relative thereto, said hook bars having end support parts providing guide surfaces and by which the bars are normally suspended below their respective axes of rotation relative to the chains, and said hook bars having rows of oppositely projecting cooky carrying tangs thereon, an unloading mechanism including a plurality of normally stationary guide members supported for engagement with said guide surfaces of the end support parts of the hook bars, movable elements at spaced positions relative to the conveyor and guide members and driven in timed relationship to the conveyor for removing cookies from the tangs, said guide members being positioned and arranged to hold the hook bars and tanks in predetermined positions near the movable elements, and a manually operable handle connected by links to said guide members for moving the guide members to and from their normal hook bar holding positions.

7. In a mechanism for unloading cookies and the like from tangs on a conveyor while the conveyor is in motion, the combination comprising a shaft supported by bearings for rotational movement adjacent the conveyor, a row of fingers carried by the shaft and projecting toward the conveyor, one of said bearings being at one end of the shaft and so constructed that the shaft may be longitudinally withdrawn therefrom, and the other of said bearings being near the other end of the shaft and including a bearing block having an open side slot of a size to pass the shaft and a manually movable element mounted on the bearing block for swinging movement to and from a position in which passage of the shaft through the slot is blocked.

8. In a mechanism for unloading cookies and the like from tangs on a conveyor while the conveyor is in motion, the combination comprising a shaft supported by bearings for rotational movement adjacent the conveyor, a row of fingers carried by the shaft and projecting toward the conveyor, arms secured to one end of the shaft in angular relationship to one another, one of said arms having a cam follower thereon, a removable weight carried by the other of said arms, and the relative lengths and positions of said arms being such that the shaft and fingers swing in one direction from a normal position when the weights are removed and in the other direction when the weights are on the arm.

9. In combination with a dip-coating conveyor for the production of cookies and the like and including substantially parallel side chains carrying hook bars in spaced and substantially parallel relationship, which hook bars are rotatable relative to the side chains and have rows of oppositely projecting tangs thereon, and which side chains are guided at an unloading position by aligned pairs of coaxial sprockets having the axes of the pairs in spaced relationship, an unloading mechanism including shafts parallel to the axes of the pairs of sprockets and each located near one of the said axes, means providing fingers projecting outwardly in a row from each of said shafts and spaced longitudinally of the shafts so as to be aligned with the spaces adjacent opposite sides of the tangs on the hook bars when the hook bars pass predetermined portions of pairs of sprockets, said fingers being normally swingable about the axes of the shafts from and to positions near the hook bars, means for biasing the shafts in one direction, cams driven from the conveyor for actuating the shafts and their fingers in timed relationship to the movements of the hook bars, said means for biasing the shafts in one direction comprising lever arms secured to the shafts, and removable weight carried by the lever arms.

10. In combination with a dip-coating conveyor for the production of cookies and the like and including substantially parallel side chains carrying hook bars in spaced and substantially parallel relationship, which hook bars are rotatable relative to the side chains and have rows of oppositely projecting tangs thereon, and which side chains are guided at an unloading position by aligned pairs of coaxial sprockets having the axes of the pairs in spaced relationship, an unloading mechanism including shafts parallel to the axes of the pairs of sprockets and each located near one of the said axes, means providing fingers projecting outwardly in a row from each of said shafts and spaced longitudinally of the shafts so as to be aligned with the spaces adjacent opposite sides of the tangs on the hook bars when the hook bars pass predetermined portions of pairs of sprockets, said fingers being normally swingable about the axes of the shafts from and to positions near the hook bars, means for biasing the shafts in one direction, cams driven from the conveyor for actuating the shafts and their fingers in timed relationship to the movements of the hook bars, and there being a guide intermediate sprockets of said pairs for effecting reversal of the positions of the hook bars and their oppositely projecting tangs, whereby the fingers on one shaft move along the tangs on one side of each hook bar and the fingers on the other shaft move along the tangs on the other side of each hook bar.

NATHAN J. WATSON.

REFERENCES CITED

The following references are of record in the file of this patent:

UNITED STATES PATENTS

| Number | Name | Date |
| --- | --- | --- |
| 1,130,377 | Collis | Mar. 2, 1915 |
| 1,820,182 | Cooper | Aug. 25, 1931 |
| 1,858,732 | Farnham | May 17, 1932 |